United States Patent [19]

Isabelle et al.

[11] Patent Number: 5,355,622
[45] Date of Patent: Oct. 18, 1994

[54] PLANT POUCH

[75] Inventors: Scott P. Isabelle, 416 Rte. 210, Stoney Point, N.Y. 10980; John Lipscomb, Pearce, Ariz.

[73] Assignee: Scott Paul Isabelle, Stoney Point, N.Y.

[21] Appl. No.: 30,917

[22] Filed: Mar. 15, 1993

[51] Int. Cl.$^5$ ............................................. A01G 9/02
[52] U.S. Cl. ............................................. 47/66; 47/59
[58] Field of Search ...................... 47/66, 59; 206/423

[56] References Cited

U.S. PATENT DOCUMENTS 4,209,945 7/1980 Dent et al. .................................. 47/66

FOREIGN PATENT DOCUMENTS

| 216283 | 12/1960 | Austria .................................. 47/66 |
| 3244703 | 6/1984 | Fed. Rep. of Germany ........... 47/66 |
| 3310883 | 9/1984 | Fed. Rep. of Germany ........... 47/66 |
| 2641442 | 7/1990 | France .................................. 47/59 |
| 1459193 | 12/1976 | United Kingdom .................... 47/66 |
| 8203529 | 10/1982 | World Int. Prop. O. ............... 47/66 |
| 8600494 | 1/1986 | World Int. Prop. O. ............... 47/59 |
| 8703168 | 6/1987 | World Int. Prop. O. ............... 47/59 |

*Primary Examiner*—Ramon S. Britts
*Assistant Examiner*—Joanne C. Downs
*Attorney, Agent, or Firm*—Abdallah & Muckelroy

[57] ABSTRACT

A transportable, long-term growth pouch for a plant. The plant pouch is a polypropylene enclosure having an opening in its top wall for extension of the growing plant and is formed having a low height so that it can lay close to the ground in use. In a further embodiment of the present invention the plant pouch includes a lower chamber that houses rocks, sand, granular particles, etc. that are selectively released for decorative support of the growth medium.

6 Claims, 2 Drawing Sheets

PLANT POUCH

BACKGROUND OF THE INVENTION

The present invention generally relates to flower pots and like mediums for cultivating and growing plants. More specifically, this invention relates to a portable pouch for out-of-ground plant growth.

Various containers are known in the art for cultivating and growing plants. These prior art containers include portable containers and structures for out-of-ground cultivation of plants. Out-of-ground containers and structures are generally directed to providing a medium for initiating plant growth whereupon after sufficient initial growth the plant is transferred to the ground. An exemplary prior art container for out-of-ground plant cultivation is shown in U.S. Pat. No. 3,524,279 to Adams. The Adams patent discloses a synthetic plant growth medium having an overwrap to retard the rate of water evaporation from the growth medium. In U.S. Pat. No. 3,733,745 to Ingerstedt et al. a germination and seedling promoting unit is disclosed that includes an envelope containing compressed moisture-absorbing material and further includes holes formed in the bottom side of the envelope for absorbing ground moisture. U.S. Pat. No. 4,251,951 to Heinstedt discloses a growth medium for out-of-ground plant cultivation that includes a plurality of thermoplastic sheet envelopes each containing compressed peat and a seed for in-ground germination. The respective envelopes of the Heinstedt growth medium are formed having an upper side opening for plant extension after the seed has germinated, and an underside opening to prevent developing roots from working their way out of the cultivating substrate. U.S. Pat. No. 4,939,865 to Whitcomb et al. discloses a container comprising a set of upwardly extending, removably joined side panels for growing transplantable plants. In U.S. Pat. No. 5,081,791 to Baron et al. a growth medium for out-of-ground cultivation is disclosed that comprises wetted superabsorbent particles disposed between two sheets of cellulose wadding and supported by two sheets of polyethylene welded at their edges.

As noted, the above-described growth mediums are provided for out-of-ground cultivation of plants and the like. The prior art also discloses portable packages for long-term growth of plants. A horticultural cell system for plant growth is shown in U.S. Pat. No. 3,872,621 to Greenbaum. The cell system of the Greenbaum reference comprises a belt of sheet material folded longitudinally and sealed along lines transverse to and spaced apart along the belt to form a series of separated cells at a top portion thereof and a continuous open-ended tube at a bottom portion thereof. U.S. Pat. No. 4,209,945 to Dent et al. discloses a plant growth package comprising a flexible outer container filled with flowable filling material and having a pair of spaced apart openings in the top surface of the container to thereby form a carrying handle between the openings.

The most widely known portable growth medium for a plant is the flower pot. Flower pots generally extend 4"-6" above ground level and therefore have limited utility when it is desirous to create an aesthetic arrangement of plants, flowers and the like. A preferred portable growth medium to meet aesthetic requirements should lay close to the ground so that it may be covered by the growing plants.

These and other limitations of prior art cultivating and growing planters are overcome by the portable plant pouch of the present invention.

SUMMARY OF THE INVENTION

The present invention is a transportable plant pouch for long-term growth of a plant. The plant pouch comprises a substantially square polyethylene envelope having an opening formed in a top wall of the envelope and a irrigation connector formed in a side wall or an end wall of the envelope. The plant pouch extends not more than two inches above the ground surface to permit its use in forming aesthetic arrangements of plants.

An object of this invention is to provide a transportable planter for growing a plant.

Another object of this invention is to provide a planter that includes an irrigation connector.

A further object of the present invention is to provide a portable planter that lays close to the ground surface in use.

It is also an object of this invention to provide a long-term growth medium for plants that includes a transportable above-ground support base.

These and other objects and advantages of the present invention will be apparent to those skilled in the art from the following description of a preferred embodiment, claims and appended drawings.

DESCRIPTION OF A PREFERRED EMBODIMENT

Figure 1:
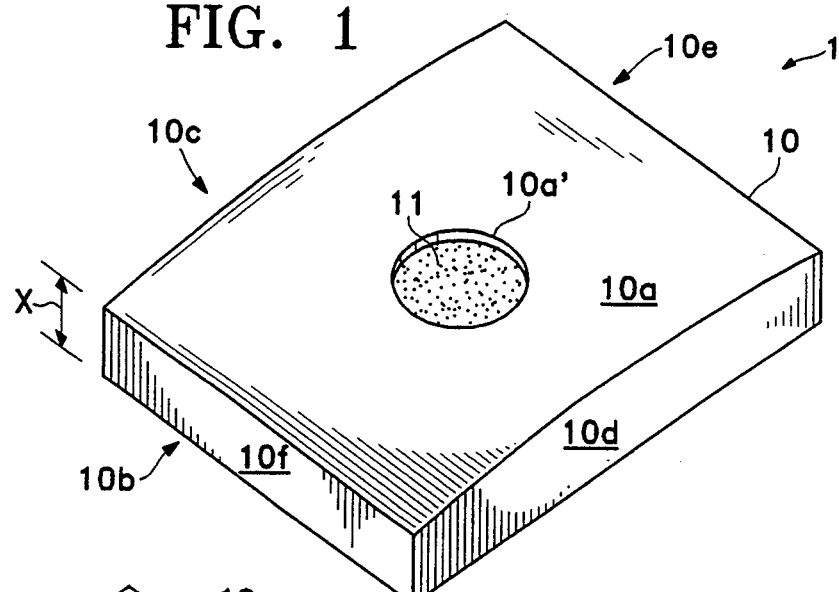
FIG. 1 is a top perspective view of a first preferred embodiment of the plant pouch of the present invention.

FIG. 1 illustrates in a top perspective view a first preferred embodiment of the plant pouch 1 of the present invention. First plant pouch 1 generally comprises an envelope 10 having a top wall 10a and an opposing bottom wall 10b, opposing side walls 10c and 10d, and opposing end walls 10e and 10f. Envelope 10 is preferably formed from polyethylene or other material impervious to liquid. The respective top wall 10a, bottom wall 10b, side walls 10c, 10d and end walls 10e, 10f are integrally-constructed at adjacent edges thereof to provide a sealed envelope. The height of side walls 10c, 10d, indicated by "X" in FIG. 1, preferably extend one to two inches above the ground surface. This construction of the present invention provides a first plant pouch 1 having a low vertical profile. The low vertical profile of first plant pouch 1 provides a growth medium that can be covered by a flowering plant to aid in accomplishing the desired aesthetics of a flower or plant arrangement. A top wall opening 10a' is formed substantially in the center of the top wall 10a of envelope 10 to permit a growing plant to extend therethrough. A planting mixture 11 is disposed in the interior portion of the envelope 10 to provide a growth medium.

Figure 2:
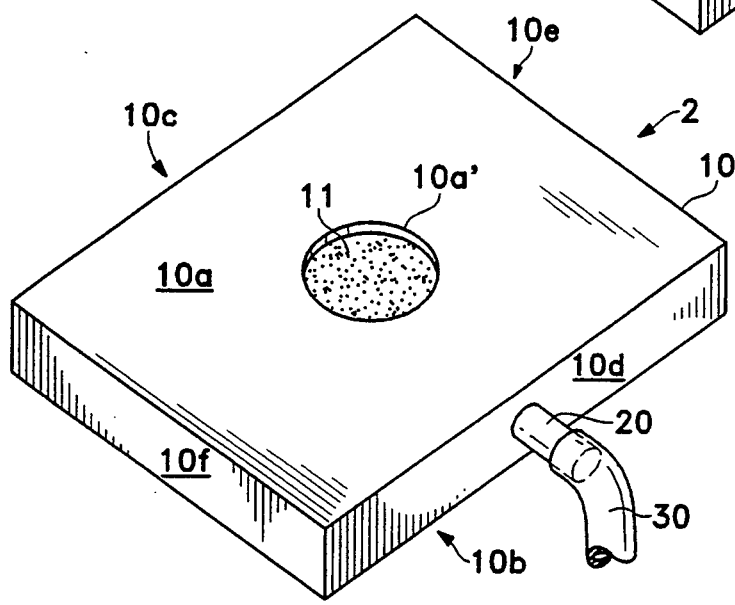
FIG. 2 is a top perspective view of a second preferred embodiment of the plant pouch of the present invention.

FIG. 2 illustrates in a top perspective view of a second preferred embodiment of the plant pouch 2 of the present invention. Second plant pouch 2 is formed substantially the same as first plant pouch 1 having integrally-constructed envelope 10 comprising opposing top wall 10a and bottom wall 10b, opposing side walls 10c and 10d, and opposing end walls 10e and 10f, and a top wall opening 10a' formed in the top wall 10a of the envelope 10. Second plant pouch 2 further includes a first irrigation connector 20 disposed in a side wall 10d of the envelope 10. First irrigation connector 20 communicates with the interior portion of envelope 10 and provides means to connect a water hose 30 or the like to envelope 10 for irrigating the planting mixture 11. In the second plant pouch 2 first irrigation connector 20 comprises a substantially short length of tubing fixedly attached at one end thereof to the side wall 10d of envelope 10.

Figure 3:
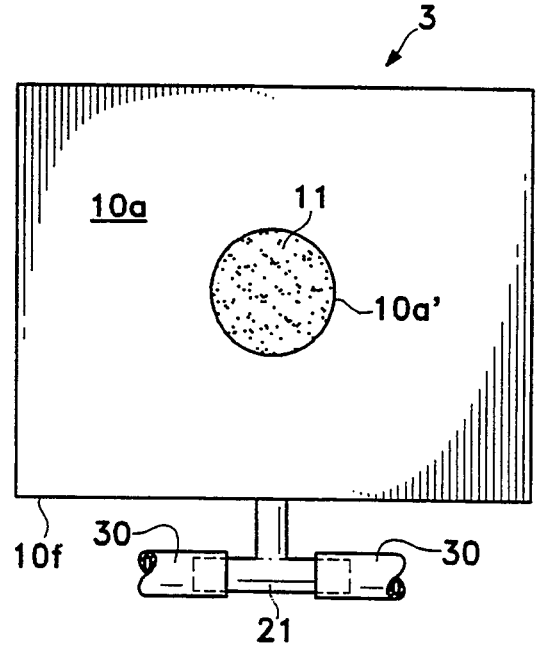
FIG. 3 is a top plan view of a third preferred embodiment of the plant pouch of the present invention.

A top plan view of a third preferred embodiment of plant pouch 3 is illustrated in FIG. 3. Third plant pouch 3 is formed substantially similar to the second plant pouch 2 illustrated in FIG. 2. Third plant pouch 3 however includes a second irrigation connector 21 formed as a T-connector and disposed in an end wall 10f of the envelope 10. Second irrigation connector 21 permits a plurality of plant pouches to be simultaneously irrigated by connecting therebetween water hoses 30 or the like.

Figure 4:
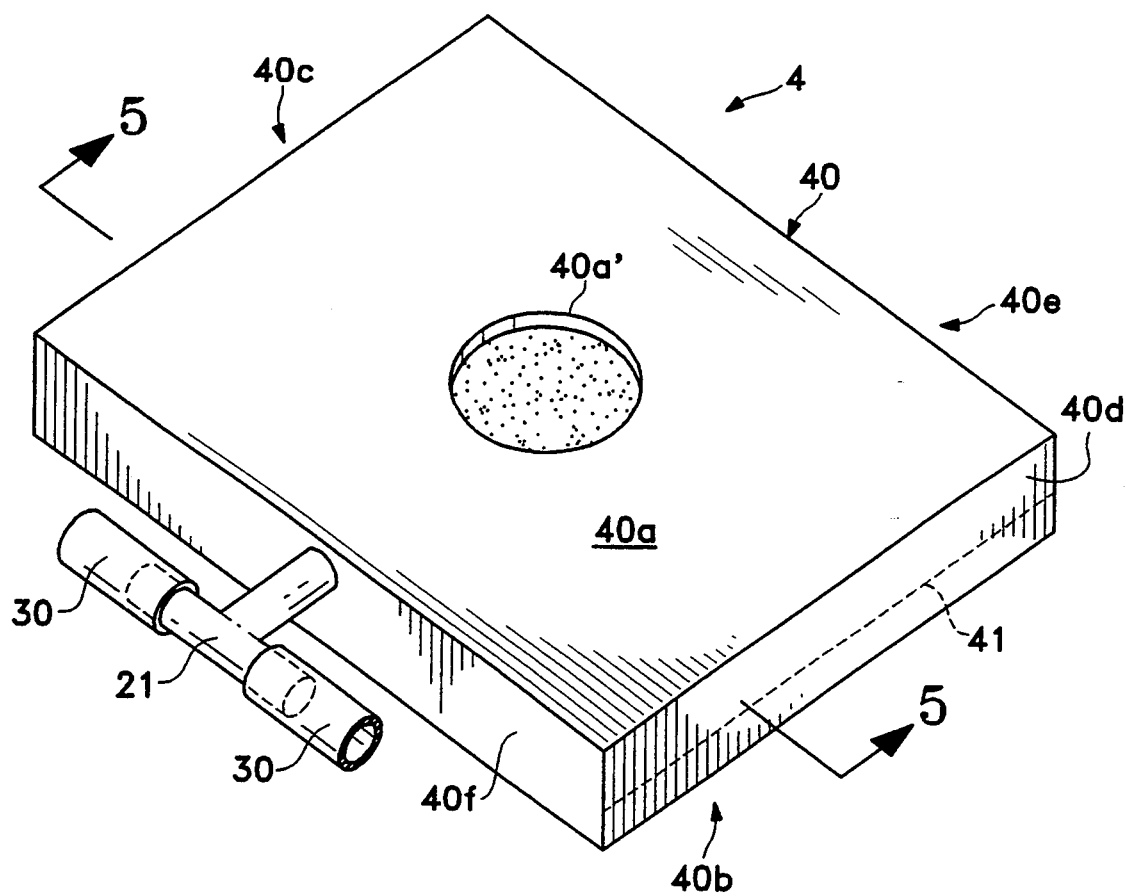
FIG. 4 is a top perspective view of a fourth preferred embodiment of the plant pouch of the present invention.

FIG. 4 illustrates in a top perspective view a fourth preferred embodiment of the plant pouch 4 of the present invention. Fourth plant pouch 4 comprises a second polyethylene envelope 40 having integrally-constructed opposing top and bottom walls 40a and 40b, opposing side walls 40c, 40d and opposing end walls 40e, 40f, the top wall 40a of second envelope 40 including a top wall opening 40a' formed therein. A planting mixture 11 is disposed in the interior of second envelope 40. The side walls 40c, 40d of second envelope 40 are formed having a height preferably extending one to two inches as heretofore described. Side walls 40c, 40d further include side wall perforations 41 that extend along the length of the respective side walls 40c, 40d and the adjacent downward portions of the respective edges of the end walls 40e, 40f of second envelope 40. Fourth plant pouch 4 is shown to include a second irrigation connector 21 as heretofore described disposed in an end wall 40f of second envelope 40.

Figure 5:
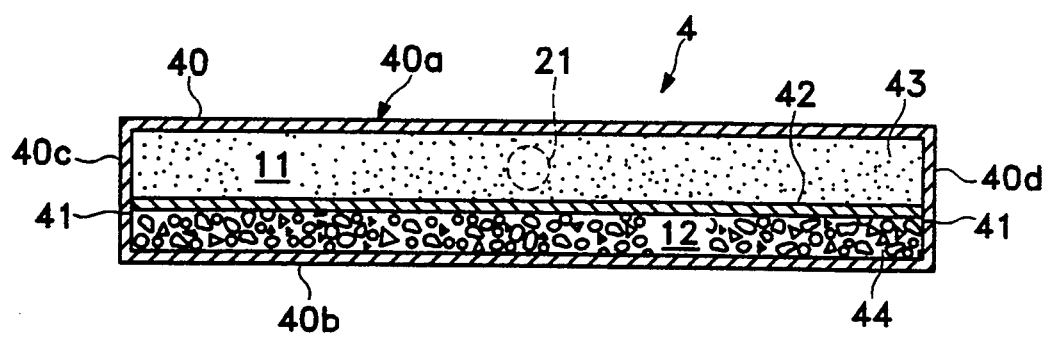
FIG. 5 is a cross-sectional view of the fourth plant pouch taken along line 5—5 of FIG. 4.

As can best be seen in the cross-sectional view of fourth plant pouch 4 illustrated in FIG. 5, fourth plant pouch 4 further includes an envelope floor 42 extending between the opposing side walls 40c, 40d and the opposing end walls (not shown) thereby dividing said second envelope 40 into an upper envelope chamber 43 and a lower envelope chamber 44. As can also be seen in FIG. 5 the perforations 41 formed in the respective side walls 40c and 40d of second envelope 40 are disposed below envelope floor 42 and the second irrigation connector 21 is disposed above envelope floor 42. Granular rock material 12 is disposed in the lower envelope chamber 44 and planting mixture 11 is disposed in the upper envelope chamber 43.

In addition to the aforementioned advantages of the plant pouch of the present invention, fourth plant pouch 4 provides a portable plant medium having a self-contained base support. Oftentimes it is desirous in the art to construct a floral arrangement on a gravel bed. In the prior art such a construction is generally accomplished by laying on the ground or other surface, such as a driveway, a sheet of plastic to eliminate weeding, and then the sheet of plastic is covered by the rock or gravel to provide a raised base support for the plant growth medium. Fourth plant pouch 4 permits the same effect to be accomplished utilizing a single, transportable construction. Fourth plant pouch 4 is positioned as desired and the perforations 41 therein are then broken to release the granular rock material disposed in the lower envelope chamber 44. Thereby a gravel bed is formed for the growth medium. Various grain sizes and colors may be disposed in the lower envelope chamber 44 to provide wide flexibility in base supports for floral arrangements.

Various changes, additions and modifications may be made to the preferred embodiments of the present invention without departing from the spirit and scope of the present invention. Such changes, additions and modifications within a fair reading of the following claims are intended as part of the present disclosure.

Therefore, in view of the foregoing, I claim:

1. A plant pouch comprising
an envelope having integrally-constructed opposing top and bottom walls, opposing side walls and opposing end walls, said top wall including a top wall opening formed therein, said side walls having a height not exceeding two inches, said envelope further including an envelope floor extending between the opposing side walls and the opposing end walls thereby dividing said envelope into an upper envelope chamber and a lower envelope chamber, and at least one side wall including perforations extending along its length below the envelope floor, a planting mixture being disposed within the upper envelope chamber and granular rock material being disposed within the lower envelope chamber, the perforations in at least one side wall thereby permitting said granular rock material to be selectively released from the lower envelope chamber to form a raised growth medium support.

2. A plant pouch as in claim 1 further including an irrigation connector disposed in an end wall of said envelope and communicating with the planting mixture disposed within the upper envelope chamber.

3. A plant pouch as in claim 2 wherein said irrigation connector comprises a T-connector.

4. A plant pouch comprising
an envelope having opposing top and bottom walls, opposing side walls and opposing end walls, said top wall including a top wall opening formed therein, said side walls having a height not exceeding two inches, said envelope further including an envelope floor extending between the opposing side walls and the opposing end walls thereby dividing said envelope into an upper envelope chamber and a lower envelope chamber, at least one of the side walls of said envelope including perforations extending along its length below the envelope floor, an irrigation connector being disposed in an end wall of said envelope and communicating with an inside portion of the upper envelope chamber,
planting mixture disposed within the upper envelope chamber, and
granular rock material disposed within the lower envelope chamber.

5. A plant pouch as in claim 4 wherein said irrigation connector comprises a T-connector.

6. A plant pouch as in claim 4 wherein said irrigation connector comprises a short length of tubing.

* * * * *